US 6,603,577 B1

(12) United States Patent
Ravishankar et al.

(10) Patent No.: US 6,603,577 B1
(45) Date of Patent: *Aug. 5, 2003

(54) FACSIMILE CALL SUCCESS RATES IN LONG DELAY AND IMPAIRED CHANNEL ENVIRONMENTS WITHOUT COLLISION DETECTION

(75) Inventors: Channasandra S. Ravishankar, Germantown, MD (US); Brandt Springman, Washington, DC (US); Sundari Balachandran, Rockville, MD (US); Junhao Shi, Gaithersburg, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/440,744

(22) Filed: Nov. 16, 1999

Related U.S. Application Data

(60) Provisional application No. 60/108,824, filed on Nov. 17, 1998.

(51) Int. Cl.[7] ................................. H04N 1/00
(52) U.S. Cl. ..................... 358/434; 358/400; 358/405; 358/406; 358/407; 379/100.17; 379/100.09; 379/100.06
(58) Field of Search ................ 358/434, 400, 358/405, 406, 407, 435, 436, 438, 439, 442, 443; 379/100.17, 100.09, 100.05, 100.06, 93.31, 100.13, 100.14, 100.15; 370/279, 236, 468, 280

(56) References Cited

U.S. PATENT DOCUMENTS

| | | | |
|---|---|---|---|
| 4,736,249 A | * | 4/1988 | Iizuka et al. ............... 358/435 |
| 5,526,355 A | * | 6/1996 | Yang et al. ................. 370/448 |
| 5,561,844 A | * | 10/1996 | Jayapalan et al. .......... 455/33.2 |
| 5,790,641 A | * | 8/1998 | Chan et al. ............. 379/100.17 |
| 6,147,978 A | * | 11/2000 | John et al. .................. 370/279 |
| 6,411,689 B1 | * | 6/2002 | Shi et al. ................ 379/100.17 |

FOREIGN PATENT DOCUMENTS

| | | | | |
|---|---|---|---|---|
| WO | WO 92/02100 | * | 2/1992 | ............ H04N/1/32 |
| WO | WO 95/22224 | * | 8/1995 | |
| WO | Wo 00/30339 | * | 5/2000 | ............ H04N/1/00 |

* cited by examiner

Primary Examiner—Edward Coles
Assistant Examiner—Tia Carter
(74) Attorney, Agent, or Firm—John T. Whelan; Michael Sales

(57) ABSTRACT

A facsimile transmission relay apparatus, referred to as an Intelligent Facsimile Relay (IFR) for improving call success rates in long delay environment such as terrestrial cellular, fixed wireless, and geostationary mobile satellite systems and the like. A first bi-directional telecommunications interface is provided for receiving facsimile signals from a transmitting facsimile device via a first network such as a Public Switch Telephone Network (PSTN). A buffer memory is used by the IFR for storing the facsimile signal, and a second bi-directional telecommunications interface retransmits the facsimile signal via the second network. An information processor is coupled to the second interface for monitoring messages from the receiving facsimile device and for generating messages to the receiving facsimile device to maintain communications integrity with the transmitting facsimile device via the networks using selective blocking of retransmitted commands for less sensitivity to the channel errors present in wireless applications, without the need for signal collision detection. The ultimate objective of the IFR design is to prevent call failures due to long delays and/or channel impairments by monitoring, buffering, relaying, replacing, and manipulating ITU-T T.30 signals as well as generating ITU-T T.4 fill patterns.

25 Claims, 12 Drawing Sheets

Illustration of Access Methods and Delay Ranges in Wireless Environments

Illustration of ITU-T T.30 Protocol Sequence for a Typical Two Page Facsimile Call Illustration of Access Methods and Delay Ranges in Wireless Environments Illustration of Signal Collision on Two-Wire Link Due to Long Delay Collision avoidance mechanism as per GSM 03.46 on wireline (PSTN) channel Obvious Extension of Collision Avoidance Concept of GSM 03.46 to Wireless Channel Illustration of Robust Handling of Retransmitted Commands Illustration of potential weakness in DIS/DCS Phase Illustration of preventing disconnect due to the present invention Illustration of fill concept as described in GSM 03.46 and ITU-T X.38

Illustration of enhancement of fill concept for long delay environments according to present invention

FACSIMILE CALL SUCCESS RATES IN LONG DELAY AND IMPAIRED CHANNEL ENVIRONMENTS WITHOUT COLLISION DETECTION

CROSS REFERENCE TO RELATED APPLICATION

This application claims priority to Provisional Patent Application Ser. No. 60/108,824, filed Nov. 17, 1998.

BACKGROUND OF THE INVENTION

The present invention relates to methods and apparatus for increasing facsimile call success rates. More particularly, the invention relates to facsimile call transmissions in the presence of long delays and channel errors such as those present in wireless access systems, e.g., terrestrial cellular, fixed wireless, and geostationary mobile satellite systems.

Conventional facsimile machines and compatible terminals are designed for communication over a public service telephone network. Standard protocols have been adopted for communication between calling and called facsimile terminals. Examples of such protocols are those defined by the International Telegraph and Telephone Consultative Committee (CCITT) under Recommendations T.3 and T.4, known respectively as the Group 2 and Group 3 facsimile protocols. Recommendation T.30 defines a protocol for Group 2 and 3 facsimile equipment for communication over a telephone network.

Previous techniques such as flag-stuffing require explicit knowledge of delays in the systems for it to be effective, since International Telecommunications Union standard ITU-T T.30 limits the duration of High Level Data Link Control (HDLC) frames, which includes HDLC flags. Knowledge of delay would assist the flag-stuffing technique to determine the time at which flag-stuffing should start so as not to violate the T.30 frame duration constraints.

An alternative means for communication between facsimile terminals has been proposed, in which each facsimile terminal is connected to a facsimile interface unit for communication via a public service telephone network to demodulate the signal that was modulated by the facsimile machine and transmit the demodulated data on digital satellite/cellular links, and modulate the data received over these links towards the end facsimile machines. This has the advantage of conserving bandwidth on bandwidth-limited satellite/cellular networks, since otherwise the modulated signal would have to be carried at the rate of 64 kbps. Thus, encoded data suitable for transmission over a digital network is provided, for example a digital satellite link or a cellular telephone system. However, the introduction of the Facsimile Interface Units (FIU) adds processing delay to the long propagation delays in satellite/ cellular networks that might further decrease call success rates. One example where the processing delay becomes a significant source is the facsimile demod-remod unit associated with Digital Circuit Multiplication Equipments (DCME), where processing/buffering delay can be as high as 300 ms. This increased delay may cause failures in communication between the calling and called facsimile terminals. A standard for overcoming this increased delay is not provided under the Group 3 fax protocol.

The document WO 92/02100 discloses a facsimile interface unit which automatically sends a "command repeat" signal to a facsimile terminal on receipt of a command therefrom, in order to allow more time for a response signal to be received.

The INMARSAT-B (TM) System Definition Manual, Issue 2, dated September 1989, proposes programming a facsimile interface unit to send a sequence of flags to a facsimile terminal if no response signal is detected within a predetermined period of receiving a command therefrom so that the time limits for response set out in Recommendation T.30 are not exceeded at the facsimile terminal.

Another scheme that is used in the Global System for Mobile Communications (GSM) non-transparent facsimile service (GSM 03.46) is blind blocking of retransmitted commands. Here the facsimile adapter blocks re-transmitted commands from reaching the remote end until a response is received from the remote end. This response is then forwarded to the command sending entity which thinks that it is a response to the most recently retransmitted command although it is a delayed response to the first transmitted command. This scheme has the potential danger of timing out at the postmessage phase of the facsimile call if too many retransmissions occurred during image transfer phase of facsimile call. WO 95/22224 provides a solution to the long delay problem by using the flag-stuffing, where the HDLC flags are autonomously generated by Intelligent Facsimile Relay (IFR) equivalents. The facsimile interface unit disclosed in WO 95/22224 detects a transmitted signal from a transmitting facsimile apparatus and detects whether a response signal to said transmitted signal is received from another facsimile apparatus within a predetermined period. If no response signal is detected after a predetermined period, a command-repeat (CRP) is transmitted to the command-sending entity. This forces the command sending entity to repeat the previously transmitted command until a response is received from the remote end. While this takes care of the time-out problem of T.30, the problem of collision at the 2-wire link is not solved. This is especially true when there is a long delay in the Public Switch Telephone Network (PSTN) leg of the connection and the delay is unknown. A consequence of this is that the CRP is received in error by the command sending entity.

Collision avoidance techniques that do not need a collision detector have been well published in GSM 03.46 and ITU-T X.38. Here the Fax Adapter (FA in GSM 03.46) or FPAD of ITU-T X.38, blindly blocks or "ignores" a retransmitted command which will prevent the retransmitted command to go and collide with a response to the command at the far end. However, collisions may still occur at the near end if the time of transmission of the retransmitted command coincides with arrival of response. To solve this problem, GSM 03.46 uses a supervision timer which essentially is an estimate of a safe period in which a response can be relayed to the command sending entity without colliding with a retransmitted command. The timer is started upon arrival of a command at the FA. If the response is received by the FA after the supervision timer has expired, then the response is buffered until the arrival of a retransmitted command and then relayed to the command sending entity. Here collision is avoided on the PSTN side which has a half-duplex modem based on supervision timer.

While blind blocking, flag-stuffing techniques and the like may be used for transparent facsimile services that do not use retransmission of GSM air interface, it poses the danger of loss of the very first transmitted command on the air interface, making the scheme too sensitive to channel impairments. Furthermore, many facsimile machines ignore the first DIS command.

SUMMARY OF THE INVENTION

This invention provides a technique that will permit reliable facsimile transmission in presence of long delays.

The main advantage of this technique is that it does not require specific knowledge of the delays in the system in order to avoid signal collision and to keep the connection alive. An important assumption here is that the IFR does not have the capability to detect collision, which is typical in many practical implementations where the relay uses off-the-shelf modem chip-sets that operate in half-duplex manner.

Essentially the methods and apparatus disclosed in the described embodiments provide monitoring and/or manipulation through the use of entities, referred to as Intelligent Facsimile Relays (IFRs) that are physically located between the two end facsimile machines communicating over a long delay and possibly impaired link. The IFRs constantly monitor (and if necessary manipulate) the ITU-T T.30 protocols in both directions and intelligently decides to transmit, relay, buffer, or discard individual messages in the T.30 protocol. The primary intent is to avoid signal collisions on 2-wire interfaces (or 4-wire interfaces with half-duplex implementations) and simultaneously prevent disconnects due to repeated ITU-T T.30 time-outs. A similar problem also exists on links that may be 4-wire or full-duplex channel in nature, but the link is controlled via an entity whose operation is half-duplex in nature. In both cases, the effect is that the signal is lost. The primary goal of the proposed solution is to complete the pre-message (Phase B as defined in ITU-T T.30) and post-message (Phase D as defined in ITU-T T.30) handshaking of the T.30 successfully, by having the IFR monitor, store, and regenerate the T.30 handshake messages and responses, without the need for collision detection.

In addition to monitoring, whenever it is necessary to manipulate T.30 messages (such as manipulation of user rates in Digital Identification Signal (DIS), intentionally disabling Error Correction Mode (ECM) mode of operation, etc.), the IFRs perform a forced corruption if the IFRs themselves receive a T.30 message in error. Furthermore, the IFR appropriately generates and transmits standard non-user specific T.30 messages in place of the messages received from the end facsimile machines, thereby preventing the possibility of blindly relaying a possibly corrupted message to the other end. This provides additional robustness to the T.30 protocol handling.

An advantage of the disclosed technique is that it does not require specific knowledge of the delays in the system in order to avoid signal collision and to keep the connection alive, nor does it need the mechanism to detect signal collision. Other described approaches such as the collision avoidance technique, centered around a collision detection mechanism, is not available in many existing fax relays having fax modem chip-sets that operate in half-duplex mode, thereby preventing "detection" of collision. Hence a reliable mechanism is necessary to cater to such implementations.

This invention thus builds upon the collision avoidance techniques described in GSM 03.46 and ITU-T X.38; however instead of blind blocking or ignoring of retransmitted, selective blocking of retransmitted commands is proposed, that makes the protocol less sensitive to channel errors that are typical in wireless channels. In addition, the invention improves upon techniques described in GSM 03.46 and ITU-T X.38 for preventing time-out between low speed message ITU-T T.30 signal and high speed ITU-T T.4 page data.

Although, collision avoidance techniques that do not need a collision detector may ignore retransmitted commands to prevent a retransmitted command from colliding with a response from the far end, collisions nonetheless occur at the near end if the time of transmission of the retransmitted command coincides with arrival of response. To solve this problem, a supervision timer may be employed to estimate of a safe period in which a response can be relayed to the command sending entity without colliding with a retransmitted command. Thus potential collisions are avoided on the PSTN side which has a half-duplex modem based on the supervision timer.

However, if it is known that the wireless channel (which, in general, is a full-duplex channel) is controlled by an entity that operates in a half-duplex manner, then the technique of using supervision timer of 03.46 can be applied towards wireless channel to avoid simultaneous transmission and reception on wireless link. One such wireless channel that ignores data arriving on the wireless channel when it is receiving data from its near-end fax machine is the GSM Transparent fax channel. The extension of GSM 03.46 collision avoidance technique to the satellite side is applicable for such channels. Where the delays in the systems are long such that a response is always provided to a command-sending entity after it has retransmitted a command and if second retransmitted command is always blocked, then the protocol becomes extremely sensitive to errors on the channel. If the first command or first response is lost, then this would lead to a call disconnect. The invention provides techniques to improve the robustness of the protocol when collision avoidance techniques described in GSM 03.46 and ITU-T X.38 are used in wireless environments. An embodiment is described in terms of the functionality of the IFR. Although most of the description is centered around the IFR located in the base station (referred to as Network_IFR), most of the techniques are equally applicable to the IFR located at subscriber side (referred to as Subscriber_IFR). Applicability does not imply that the solutions have to be implemented on both sides of the connection.

Briefly summarized, the present invention relates to a facsimile transmission relay apparatus for improving call success rates in long delay environments. The apparatus disclosed in the embodiments relate to an intelligent facsimile relay having a first bi-directional telecommunication interface for receiving a facsimile signal from a transmitting facsimile device via a first network, such as the PSTN. The relay apparatus is provided with a buffer memory for storing the facsimile signals from the transmitting facsimile device, and a second bi-directional telecommunication interface facilitates the retransmission of the facsimile signal via a second network to a receiving facsimile device, e.g., via a wireless telecommunications network. An information processor is coupled to the second interface monitoring messages from the receiving facsimile device and for generating messages to the receiving facsimile device in order to maintain communications from the transmitting facsimile device via the first and second networks, without the need for signal collision detection but rather providing selective blocking of retransmitted commands for less sensitivity to the channel errors present in wireless applications.

It will be understood that both the foregoing general description and the following detailed description are exemplary and intended to provide further explanation of the invention as claimed. The accompanying drawings provide an understanding of the invention as described in the preferred embodiments to illustrate the invention and to serve to explain the principles of the invention.

DETAILED DESCRIPTION OF THE PREFERRED EMBODIMENTS

Figure 1:
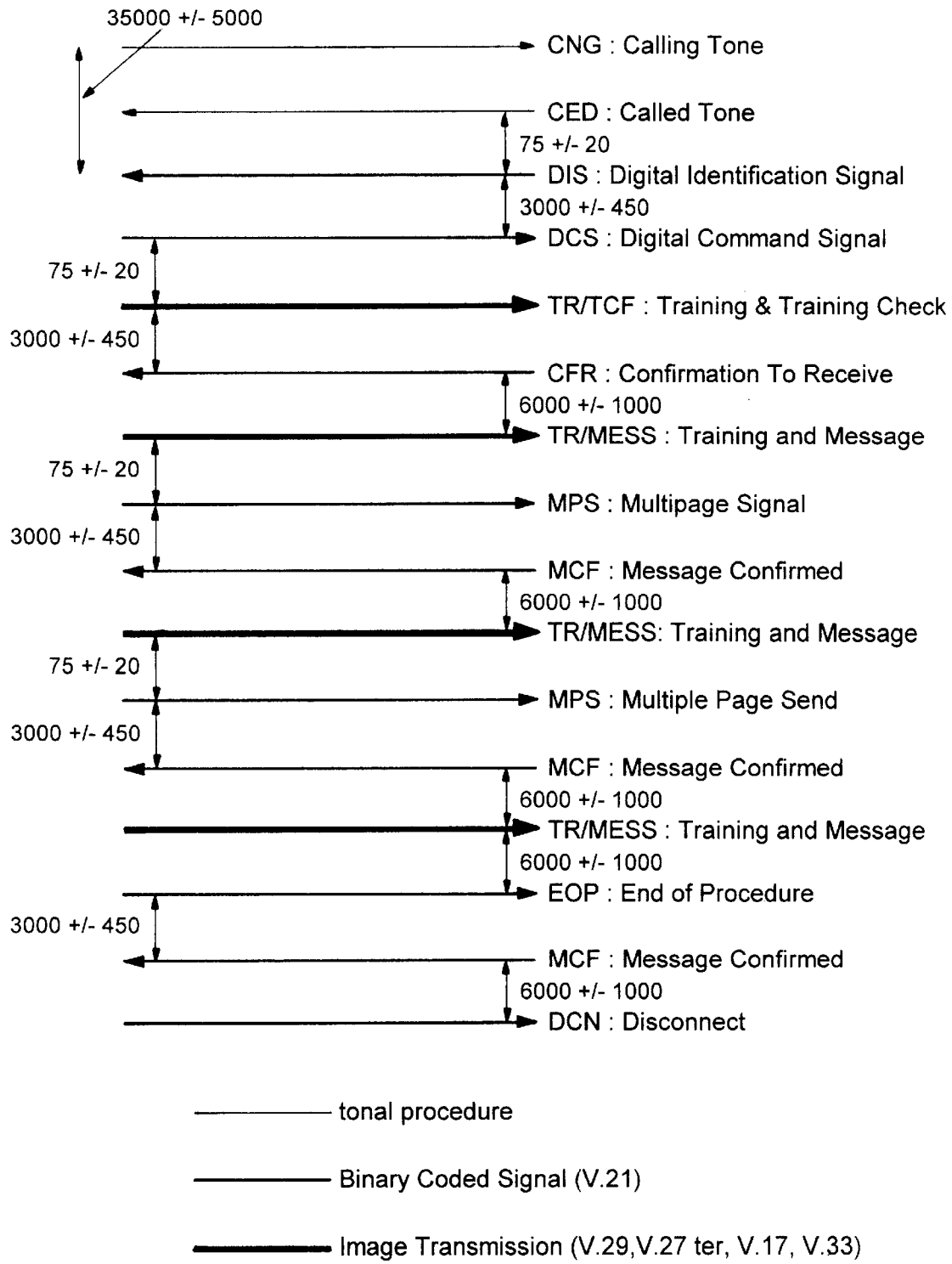
FIG. 1 is an illustration of ITU-T T.30 protocol sequence for a typical two-page facsimile call.

Facsimile transmission in presence of long propagation delays is a challenging issue due to the strict time-outs governed by the command/response sequences as defined in ITU-T T.30. A typical command/response sequence for a two page facsimile call is illustrated in FIG. 1. As seen from FIG. 1, different phases of the facsimile transmission have different time-outs and the worst case time-out is 2.55 seconds. Systems that provide wireless access to its customers typically experience delays of several hundred milliseconds between subscriber and base stations, and the delay is even longer when access is via geostationary satellite links, i.e., a wireless link 10. Such systems have to provide acceptable facsimile quality of service in call scenarios which should include international calls to and from the Public Switched Telephone Network (PSTN) 12 users where PSTN 12 itself may have an Intelsat satellite link which uses Digital Circuit Multiplication Equipment (DCME) conforming to ITU-T G.766. This delay, in addition to the delay that the facsimile machine itself introduces to formulate a response, may potentially exceed the 2.55 seconds time-out.

Figure 2:
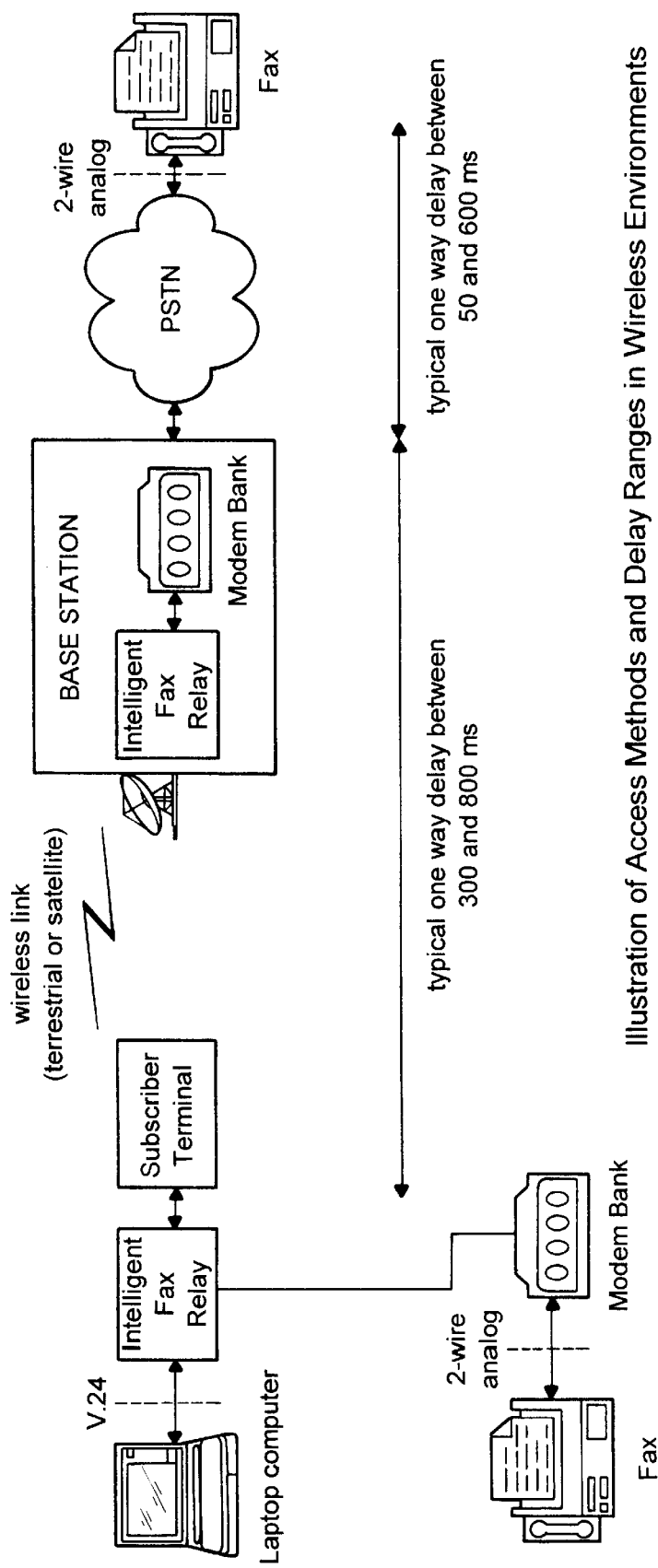
FIG. 2 is an illustration of access methods and delay ranges in wireless environments.

The conceptual block diagram of FIG. 2 shows the base station 20 including a modem bank 22 which interfaces with the PSTN 12. A facsimile machine 24 interfaces with the PSTN 12 of the base station and via a conventional 2-wire analog telephone interface. The facsimile service can be enhanced with the implementation of a pair of Intelligent Facsimile Relays (IFRs) 14,16 that are physically located in the wireless network (one at subscriber terminal and one at base station 20), successful facsimile call completion rate is expected to increase dramatically. On the subscriber end of the wireless link 10, the subscriber terminal 18 is connected to the IFR 16 of the described embodiment, which may be coupled either to a subscriber end modem bank 28 which also is interfaced to a facsimile machine 26 via a 2-wire analog telephone interface, or alternatively the IFR 16 may be connected to a personal computer such as laptop computer 30 via a V.24 telecommunications interface or the like. As illustrated, combined propagation delays relating to the wireless link 10, which may include terrestrial or satellite communications, typically result in one-way delay between 300 and 800 milliseconds, additionally the PSTN 12 typically includes a one-way delay between 50 and 600 milliseconds. Thus, it can be appreciated that while typical delays may be on the order of 1.5 seconds, such delays may potentially exceed the 2.55 second time-out associated with typical DCME equipment conforming to ITU-T standards.

FIG. 2 also illustrates the access methods and a range of typical delays as seen in wireless access systems. The upper limits of wireless access delay in FIG. 2 is applicable when the access is a geostationary mobile satellite system that uses hundreds of milliseconds of interleaving to accommodate possible fading. The upper limit of PSTN 12 delay is typical of some Intelsat links with DCME equipments conforming to G.766. It is noted that for subscriber-to-subscriber calls, the total one-way delays can be even longer than what is illustrated in FIG. 2.

Figure 3:
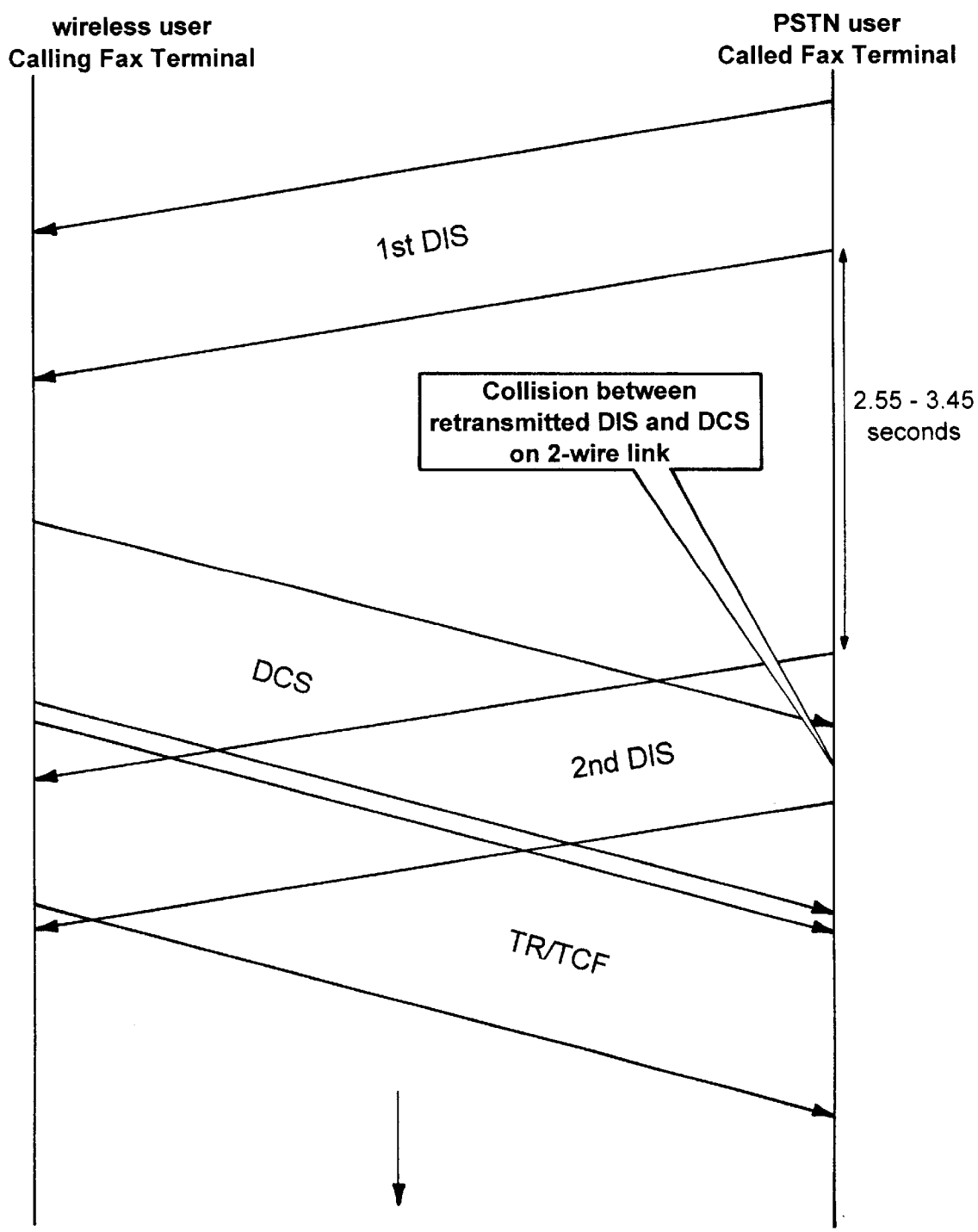
FIG. 3 is an illustration of signal collision on two-wire link due to long delay.

One of the deleterious consequences of long delays in facsimile transmission is the signal collision effects on the 2-wire link between a PSTN user and the nearest central office and/or between the wireless user and the IFRs 14,16 nearest to it. This is illustrated in FIG. 3 where a retransmitted Digital Identification Signal (DIS) collides with Digital Command Signal (DCS). The primary goal of the proposed solution is to complete the pre-message (Phase B as defined in ITU-T T.30) and post-message (Phase D as defined in ITU-T T.30) hand-shaking of the T.30 successfully, by having the IFR monitor, store, and regenerate the T.30 handshake messages and responses. The IFRs 14,16 are described in terms of the specific functionality of the apparatus to solve a specific problem. Although most of the description is centered around the IFR located in the base station (referred to as Network_IFR), most of the techniques are equally applicable to the IFR located at subscriber side (referred to as Subscriber_IFR).

It is however not necessary that all techniques described be implemented on subscriber_IFR. One extreme case where collision techniques need not be implemented in subscriber_IFR is when the wireless channel and the facsimile connection to the wireless subscriber are completely 4-wire and entities controlling these 4-wire links also operate in full-duplex mode. Furthermore, if it is known that the wireless channel is either half-duplex or it is controlled by an entity operating in half-duplex manner, it is possible for Network_IFR to use exactly the same techniques on wireless channel side to avoid collision as it would use to avoid collision on the PSTN link.

As seen in FIG. 3, the retransmitted DIS signal collides with DCS (the response to first DIS) in the 2-wire link of the PSTN user. This will result in loss of DIS and DCS. Furthermore, all further attempts to retransmit command will result in collision because of the synchronous nature in which commands and responses are generated and the fixed delay between the two facsimile machines. Hence the call terminates with a Disconnect (DCN) message from the calling facsimile terminal during the pre-message phase (Phase B) of the facsimile call.

Accordingly, the IFRs 14,16 monitor T.30 and make intelligent decisions as to whether the response to a command should be forwarded to the other end. The objective is to avoid collision at the 2-wire link and successfully complete Phase B and Phase D portions of the call, as defined in ITU-T T.30.

Figure 4:
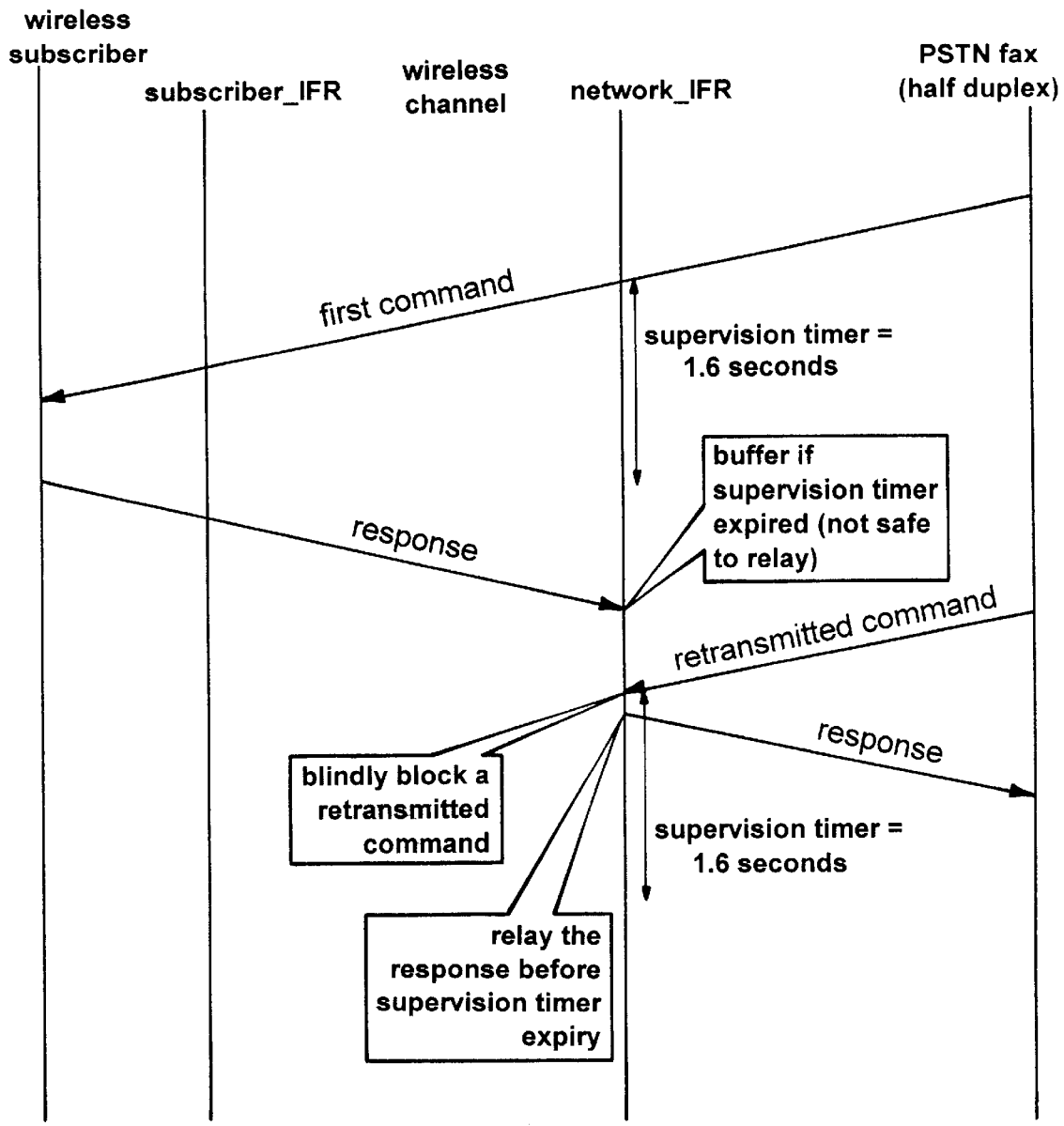
FIG. 4 is an illustration of collision avoidance mechanism on PSTN side when GSM 03.46 technique is employed.

Collision avoidance techniques that do not need a collision detector have been well published in GSM 03.46 and ITU-T X.38. Here the Fax Adaptor (FA in GSM 03.46) or FPAD of ITU-T X.38 blindly blocks or "ignores" a retransmitted command which will prevent the retransmitted command to go and collide with a response to the command at the far end. However, collisions may still occur at the near end if the time of transmission of the retransmitted command coincides with arrival of response. To solve this problem, GSM 03.46 uses a supervision timer which essentially is ail estimate of a safe period in which a response can be relayed to the command sending entity without colliding with a retransmitted command. The timer is started upon arrival of a command at the FA. If the response is received by the FA after the supervision timer has expired, then the response is buffered until the arrival of a retransmitted command and then relayed to the command sending entity. This collision avoidance technique is illustrated in FIG. 4. Here collision is avoided on the PSTN side which has a half-duplex modem based on supervision timer.

Figure 5:
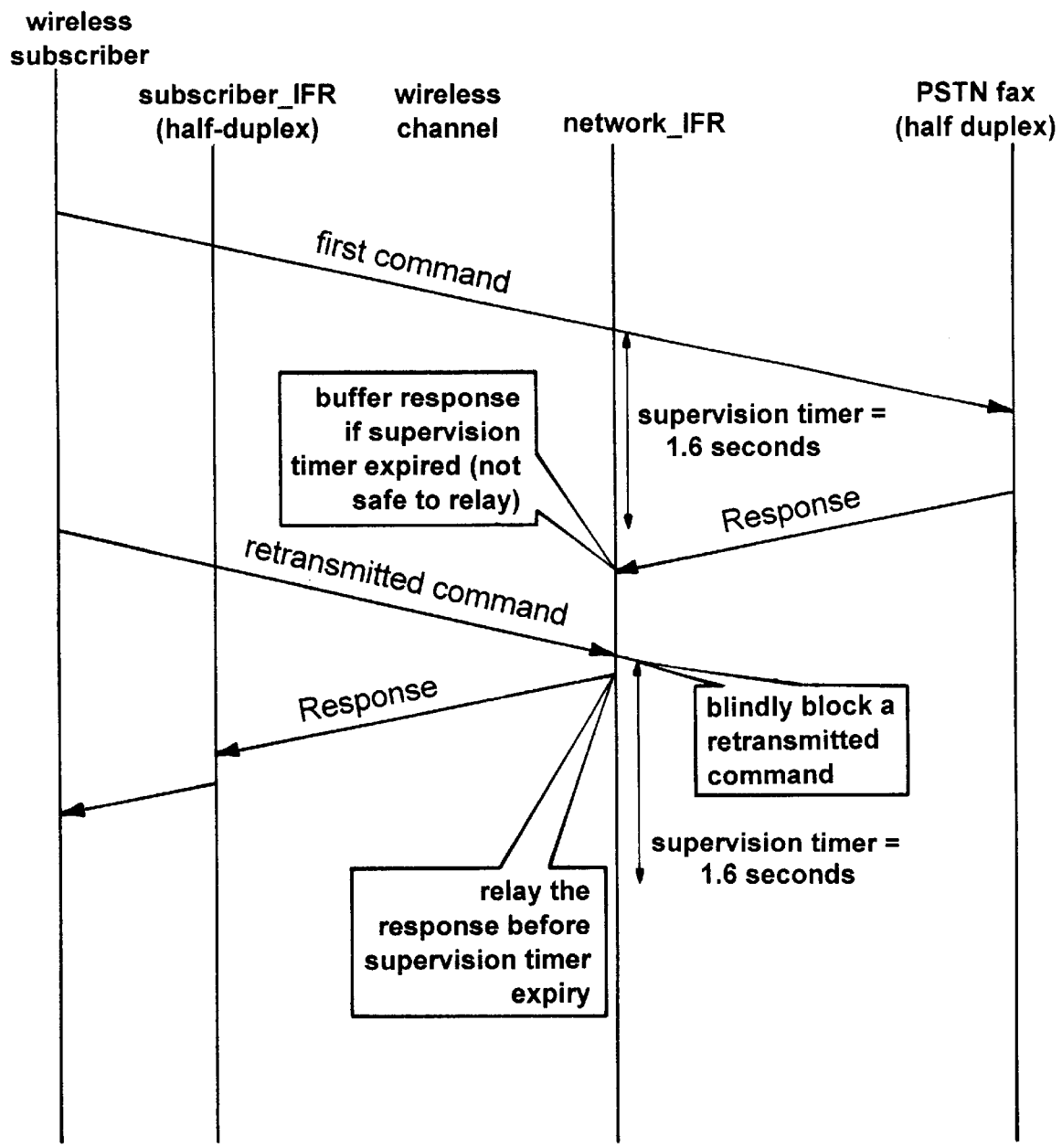
FIG. 5 is an illustration of an obvious extension of collision avoidance concept of GSM 03.46 to the wireless channel.

If it is known that the wireless channel (which, in general, is a full-duplex channel) is controlled by an entity that operates in a half-duplex manner, then it is obvious that the technique of using supervision timer of 03.46 can be applied towards wireless channel to avoid simultaneous transmission and reception on wireless link. This obvious extension of GSM 03.46 collision avoidance concept towards a wireless link is illustrated in FIG. 5. One such wireless channel that ignores data arriving on the wireless channel when it is receiving data from its near-end fax machine is the GSM Transparent fax channel. The obvious extension of GSM 03.46 collision avoidance technique to the satellite side is applicable for such channels. If the delays in the systems are long such that a response is always provided to a command-sending entity after it has retransmitted a command and if second retransmitted command is always blocked, then the protocol becomes extremely sensitive to errors on the channel. If the first command or first response is lost, then this would lead to a call disconnect. As will be discussed later some techniques described in ITU-T X.38 to overcome the situation still have problems.

The invention describes techniques to improve the robustness of the protocol when collision avoidance techniques described in GSM 03.46 and ITT-T X.38 are used in wireless environments. The invention is described in terms of the specific functionality of the IFR to solve a specific problem. Although most of the description is centered around the IFR located in the base station (referred to as Network_IFR), most of the techniques are equally applicable to the IFR located at subscriber side (referred to as Subscriber_IFR). Applicability does not imply that the solutions have to be implemented on both sides of the connection. An obvious instance where the techniques mentioned in this invention need not be applied is when the subscriber side does not have an analog 2-wire link since the major objective is to avoid collision on such links.

Handling of Retransmitted Commands

As indicated above, collision avoidance may be achieved in many practical situations, e.g., where true half-duplex modem implementations are used with the IFR. This may be accomplished without collision detection through use of supervision timers in a manner similar to that described in GSM 03.46. In situations where a response arrives at a Network_IFR after expiry of supervision timer, the response is only relayed to the command-sending entity after receipt of a retransmitted command from the command-sending entity. Furthermore, if the response is valid (has a valid FCS) this may be stored for possible future use. In any case, after the Network_IFR receives a valid response, the Network_IFR is in full control for that command-response handshake. Therefore any retransmitted command that is received after a "valid response" is blocked by Network_IFR.

However, for wireless channels that are prone to channel errors, it may so happen that either the first command itself is received incorrectly and/or the response to that command is not received even after some time. In such a case, a retransmitted command must not be blocked as described above. The ITU-T Recommendation X.38 describes retransmitting the previous command if no response is received until a T4 timer or if response to previous command is in error. The technique described in ITU-T X.38 has the potential danger of a call disconnect if the first command itself was received in error, in which case all subsequent retransmitted commands will be in error.

According to an alternate embodiment, the following rules shall be implemented in Network_IFR:

1-a) The Network_IFR "buffers" the previous command if and only if the command had a valid FCS;

1-b) The Network_IFR "relays" the retransmitted command if previous command was received in error (with invalid FCS); and 1-c) The Network_IFR "replaces" the retransmitted command by a buffered command and transmits to the other end if no response was received until the arrival of retransmitted command or Tax, whichever is greater. Tax is a timer that is started after the last byte of the previous command has been transmitted out of the IFR.

Figure 6:
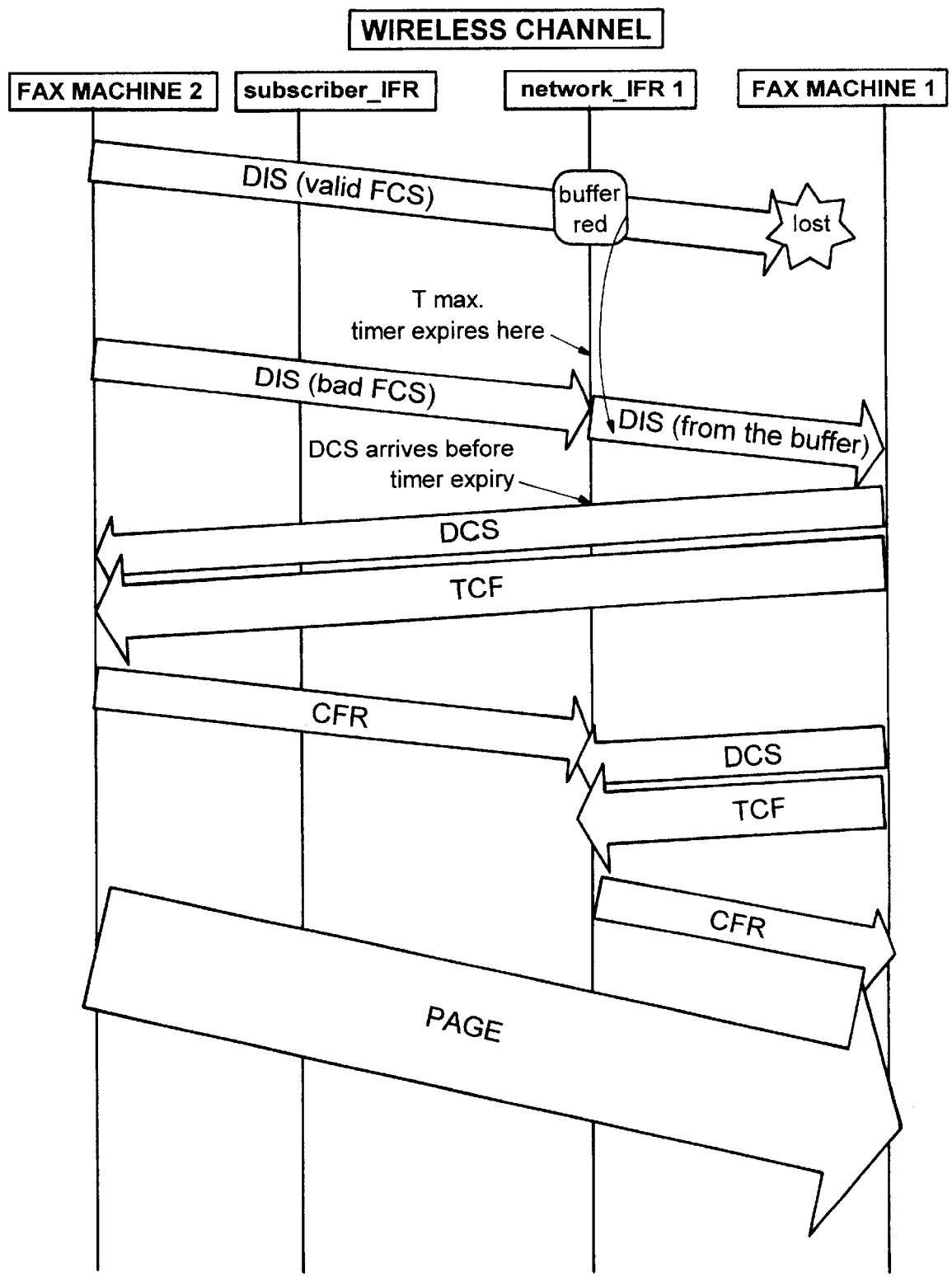
FIG. 6 is an illustration of robust handling of retransmitted commands.

FIG. 6 illustrates the scenario where the first command is buffered according to rule 1-a. This command gets corrupted after it is transmitted by IFR, which results in a lack of response even when a retransmitted command arrives at IFR. As shown in FIG. 6, rule 1-c is applied for the retransmitted command. This prevents a call disconnect.

Special Handling of FTT Response

The blocking of a retransmitted command after receiving a valid response is applicable for all command/response sequences, except for DCS-TCF/FTT sequence. The Network_IFR shall not block a retransmitted command (DCS-TCF) if it receives a FTT as a response (even if it has a valid FCS) to the first DCS-TCF. Instead, the IFR shall simply forward the retransmitted command in accordance with rules 1-a, 1-b, and 1-c and FTT is blocked. If FTT is received in response to second DCS-TCF, or, if the FTT for the first DCS-TCF is received from the receiving facsimile machine after the network-IFR has received the second DCS-TCF, then FTT is relayed to the transmitter and a manufactured DCS-TCF (as will be described next in this embodiment) will be transmitted to the receiving facsimile machine.

No Valid Response for First Three Commands

There are some fax machines that do not respond to the first DIS command and deliberately wait for the retransmitted command. A similar situation exists in some systems which depend on detection of the V.21 FSK signal (DIS being the first such signal in the T.30 protocol) to switch from the default "voice-mode" operation to facsimile mode of operation. In either case the first DIS is rendered useless. In a long delay wireless environment where the second DIS may get corrupted or when the DCS-TCF response to the second DIS gets corrupted, there is a risk of a call disconnect. For the case when the second DIS gets corrupted, the receiving fax machine receives no response even after the receiving fax machine transmits the third DIS. For the case when the DCS-TCF gets corrupted, the receiving fax machine receives a response, but is invalid. Both situations can lead to a potential disconnect since the fax machine has already transmitted the command three times.

Figure 7:
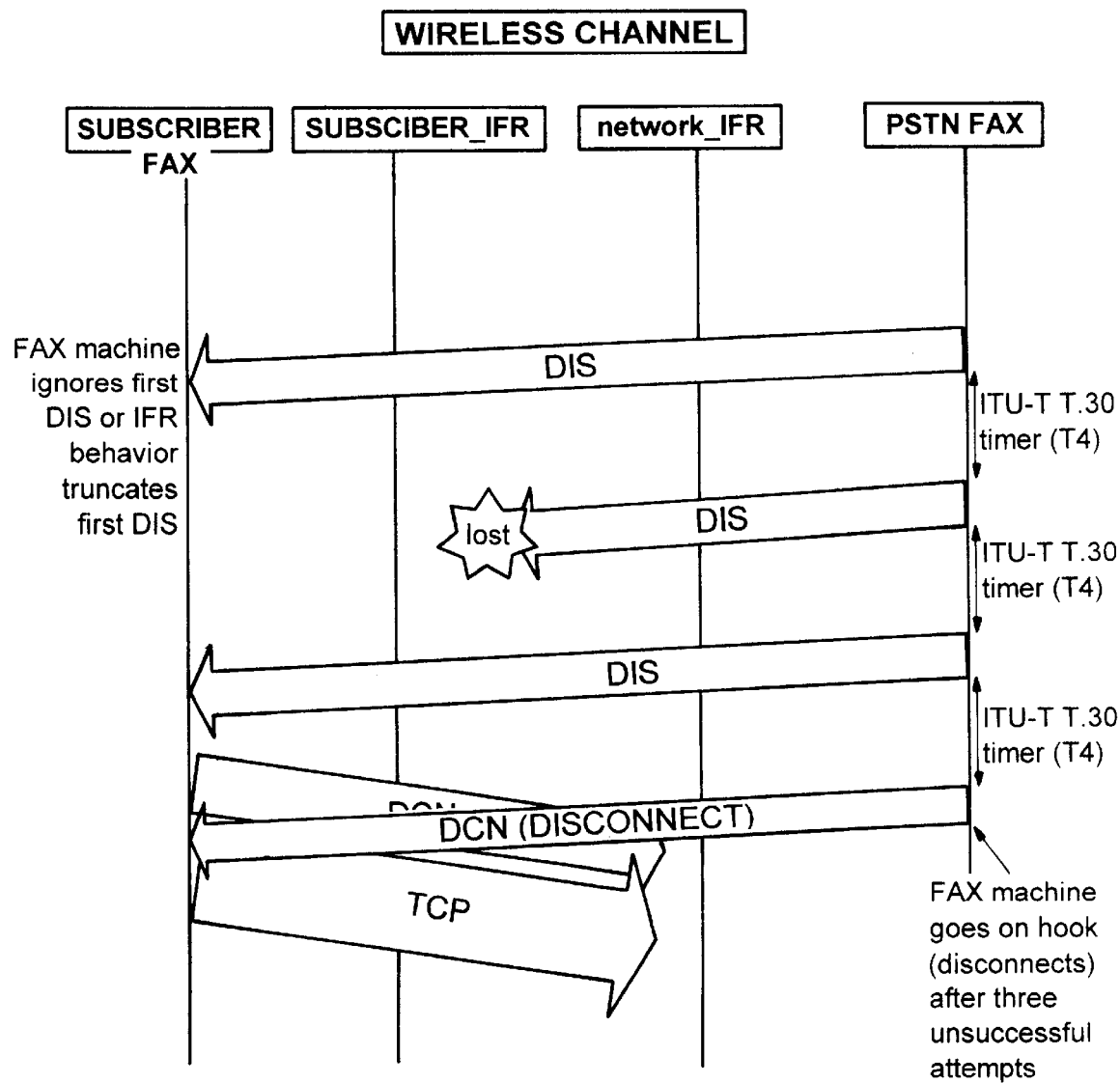
FIG. 7 is an illustration of potential weakness in DIS/DCS phase.
Figure 8:
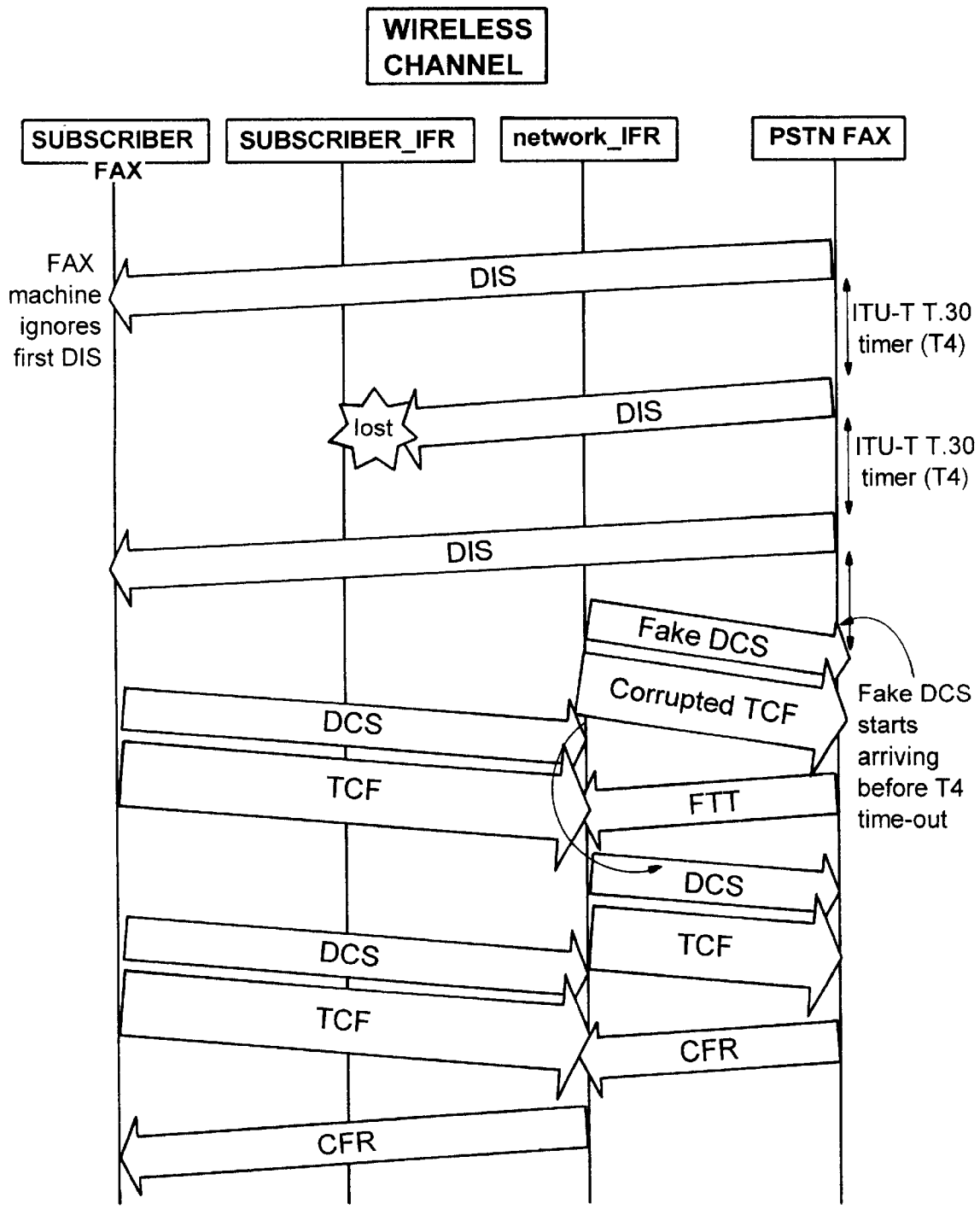
FIG. 8 is an illustration of preventing call disconnects due to the present invention.

The Network_IFR, upon receipt of the third DIS, may "manufacture" a DCS with a valid FCS, followed by 1.5 seconds of TCF that is intentionally and heavily corrupted. For example, rather than transmitting 1.5 seconds of zeroes, the Network_IFR may transmit all ones. In any case, the objective is to provoke a FTT from the receiving fax machine that will keep the connection alive. Lack of such a procedure may result in a Disconnect (DCN) from the receiving fax machine. FIG. 7 illustrates the scenario where the first DIS is ignored and second DIS is lost (corrupted) on the wireless channel resulting in the DCS-TCF arriving at the receiving fax machine after T4 timer has expired, leading to a possible DCN. FIG. 8 illustrates the method proposed to avoid a potential DCN.

A similar situation exists for the MPS, EOP, and EOM commands in post message phase. Some fax machines ignore the first MPS/EOP/EOM since they are busy preparing for the next page. In this case, if the second retransmitted command is corrupted or if the response to this command is corrupted, the protocol then has to depend entirely on the third retransmitted command. In a long delay environment this can lead to a disconnect since the command transmitting entity has already transmitted three times. In such situations, the Network_IFR shall manufacture a Retrain Negative (RTN) and transmit it to the command sending entity immediately after receiving the third retransmitted command. Any response received to third retransmitted command is ignored. This will trigger a new DCS-TCF from the transmitting fax machine and keep the connection alive.

Generation of the Fill Data

After a receiving analog fax machine has sent out Confirmation to Receive (CFR) it must see training followed by facsimile message in order to proceed successfully through the later stages of the fax call. This training must arrive before the ITU-T T.30 T2 timer (=6+/−1 seconds) at the end of CFR expires. However, due to long delays and particularly due to the collision avoidance mechanisms implemented in the IFR, the CFR reaches the other transmitting fax machine four to five seconds after it was transmitted. It is noted that if the CFR were to wait at IFR for a DCS-TCF sequence to end before getting forward to the transmitting machine, then the wait time itself can be greater than 3.5 seconds. This along with about 1.5 seconds of one way delay between transmitting and recieving fax machine will result in CFR reaching the transmitting fax machine after 4.5 seconds. A response to this (which is page data) will usually arrive after the expiry of lower limit of ITU-T T.30 T2 timer, leading to a possible disconnect. This is illustrated in FIG. 9.

Figure 9:
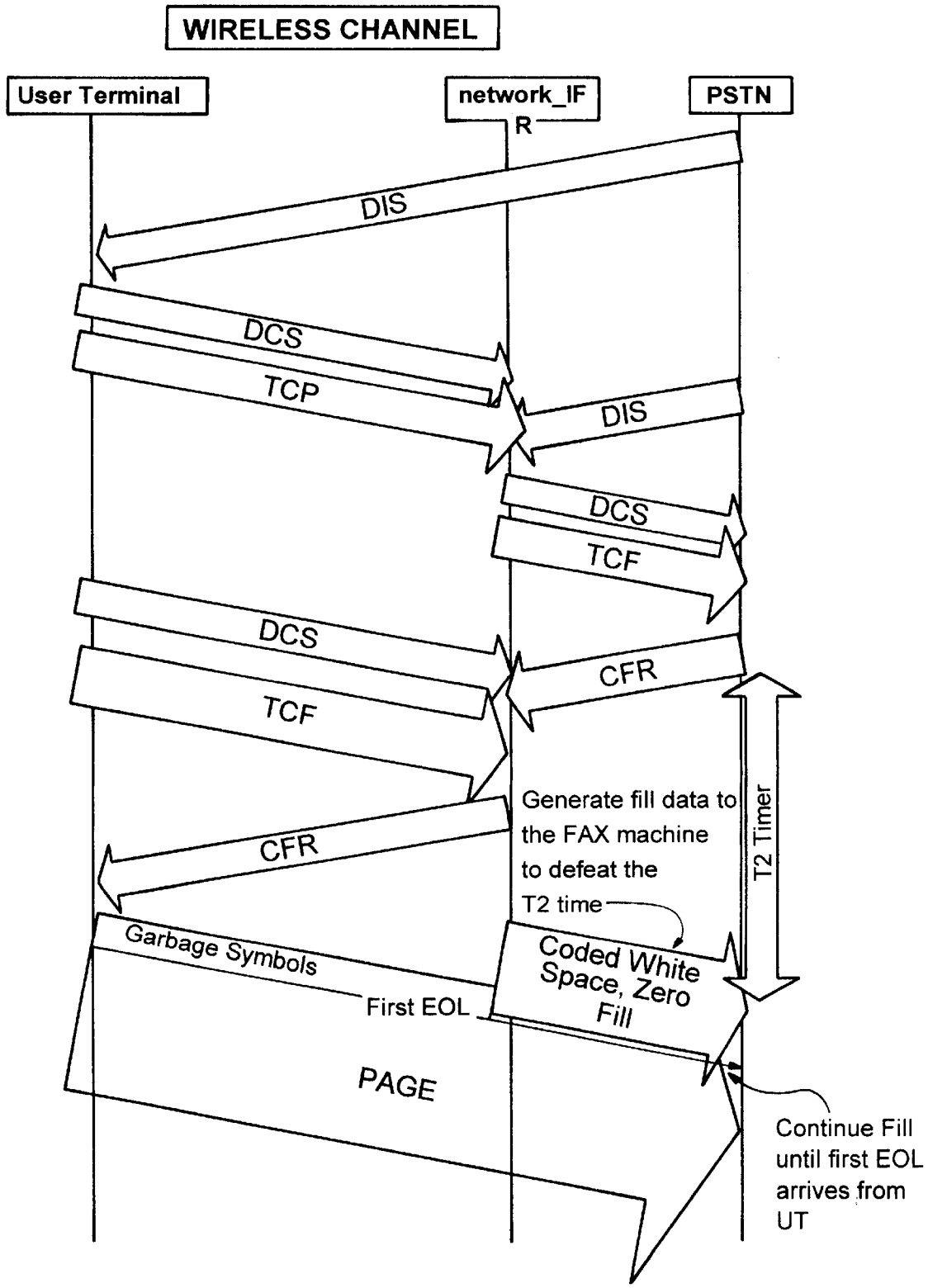
FIG. 9 is an illustration of the fill concept described in GSM 03.46 and ITU-T X.38.

Also illustrated in FIG. 9 are solutions to alleviate this problem as described in published technical specifications such as GSM 03.46 and ITU-T X.38 which essentially comprises of "fill data" being artificially generated towards receiving fax machine. In both cases, the objective is to send dummy fill data until an EOL is actually received from the transmitting fax machine. The main problem with this approach is that if the image data from transmitting data machine does not arrive in time at the IFR before the maximum fill-time (as specified in ITU-T T.4) of 5 seconds after start of generating of fill data, then the receiving fax machine can behave unpredictably.

It is also important to note that although GSM 03.46 and ITU-T X.38 describes generating fill data towards the fax machines to the near end fax machine, this concept may be extended to the far end fax machine when only one IFR is engaged in collision avoidance and time-out avoidance mechanisms. The same is true where the fill techniques described below are applicable both on the wireless channel and on the wireline channel. Accordingly, the connection may be kept alive as follows:

1) A series of coded lines (ultimately shown on fax page as blank white lines), each terminated with zero fill and EOL pattern, is generated at the IFR and sent towards the receiving machine. Each of these lines containing fill will actually show up at the top of the first fax page as white space.

2) The use of the extra zero fill within each of the coded white lines forces their transmission time to be prolonged. If each line were coded with only enough fill to meet the minimum scan length duration, the lines would be transmitted more quickly and a larger than necessary amount of white space would be prefaced to the image in order to defeat the T2 timer.

3) Each line being coded as white space, beginning with a makeup code corresponding to the number of white pixels that are in a line of the negotiated scan line length (typically 1728 pixels or 215 mm) followed by a terminating code of 0 white pixels. Each blank line is intended to occupy approximately 2 seconds and therefore approximately 19,169 fill zeroes are transmitted followed by End of Line (EOL) pattern (e.g., eleven zeroes followed by a 1).

Figure 10:
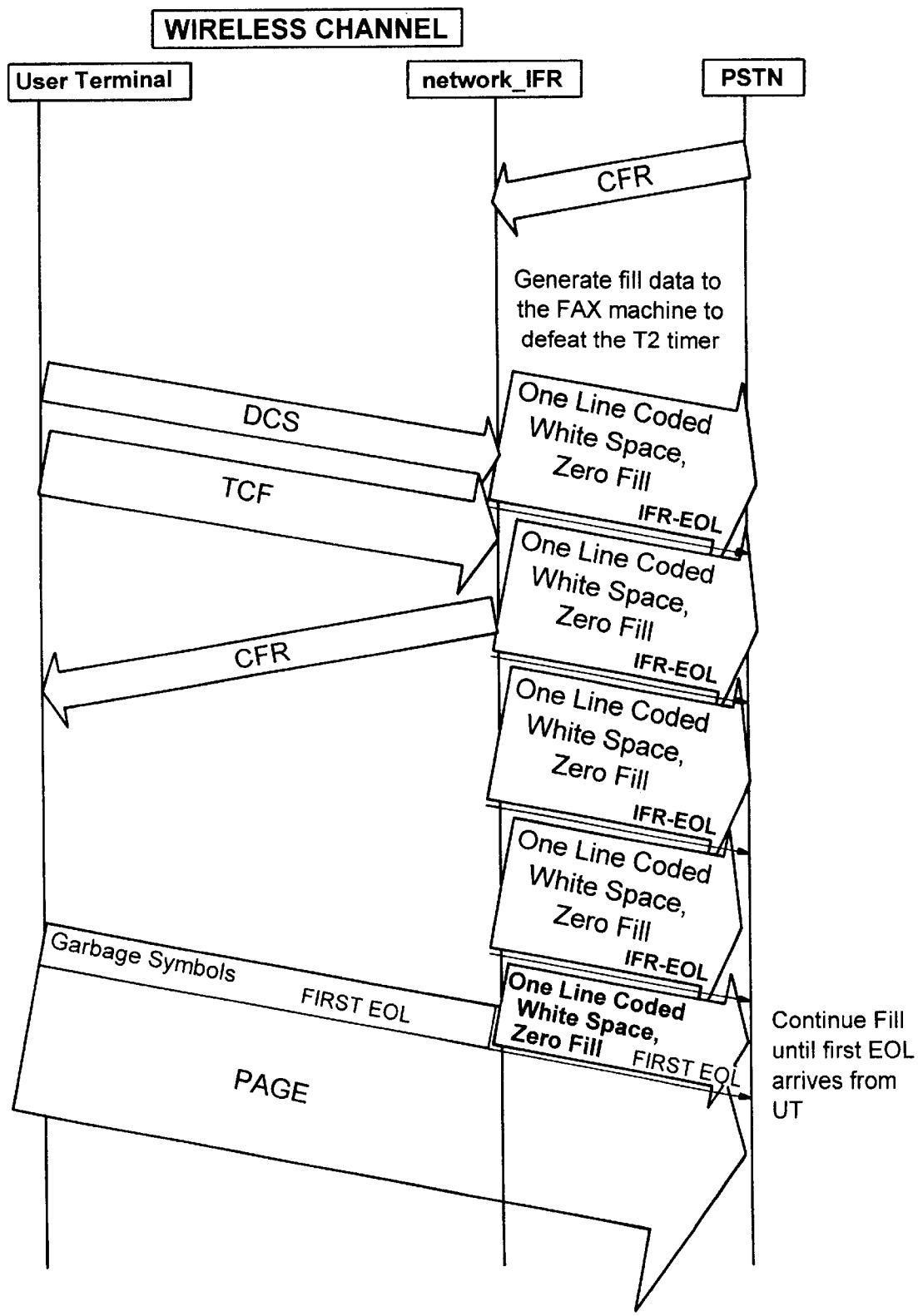
FIG. 10 is an illustration of enhancement of the fill concept for long delay environments according to the present invention.

The above is illustrated in FIG. 10 where the IFR artificially generates an EOL labeled as IFR_EOL. One objective of the preferred embodiment is to hold the receiving fax machine with as few of these dummy lines as necessary and relay the actual image data as soon as is practicable after its arrival at the IFR. To begin relay of the actual image data, one might perform the following: (1) stop putting fill, (2) put out an EOL sequence to terminate the current blank line, and (3) continue the symbol transmission with the very first image symbols recovered at the IFR. However, it is noted that the actual image symbols into the IFR may or may not be the actual image symbols sent by the transmitting fax machine. If the very first symbols to be recovered after the training sequence are erroneous symbols, perhaps due to the characteristics of the recovering modem rather than the actual symbols sent from the transmitting fax equipment, the fact that they may be relayed to the receiving fax after a valid EOL may cause undesirable results with some receiving fax equipment.

Inserting an EOL into the zero fill and following it with the first image data received will cause a line error at the receiving fax machine in the case where the first image data to arrive are not the beginning of a valid line code sequence terminated with an EOL. Since the fax machine is likely to ignore any data that precedes the first valid EOL, this invalid data may not normally cause any problem. However, allowing such bad or corrupted data to be presented to a fax machine after that machine has seen a valid EOL on that page, may cause the receiving machine to consider the line bad.

To avoid this undesirable side effect of posing zero fill and EOL in front of what may or may not be valid image data and thereby forcing the receiver to deal with a bad image line, the present embodiment inserts an EOL into the fill section of the current dummy line only when the data available from the sending fax machine contains its first valid EOL. Once the EOL has been inserted to terminate the fill, the transmission continues with the received image data that immediately follows the first valid EOL received at the IFR. This is illustrated in FIG. 10.

While the "fill" technique above and in FIG. 10 are described in response to a CFR, the same technique is applicable to MPS/MCF stage of the T.30 protocol to avoid time-out related problems.

Avoiding T2 Time-Outs for T.30 Commands

As discussed above, fill data may be generated towards the receiving fax machine after reception of CFR (in response to DCS-TCF) or MCF (in response to MPS) responses. There are occasions where a FTT is received instead of CFR or when MCF is received in response to EOP or EOM. In both these cases, the T2 timer can expire for the same reason as previously described leading to a disconnect. In such cases, rather than "fill" pattern with EOL, the IFR shall generate a short sequence (about 500 ms in duration) of High Level Data Link Control (HDLC) flags and discontinue transmission for a period of greater than 200 ms. This, according to ITU-T T.30 should reset the T2 timer thereby allowing an additional 5 to 7 seconds for the next command to reach the receiving fax machine.

Autonomous Retransmission of Valid Responses

Figure 11:
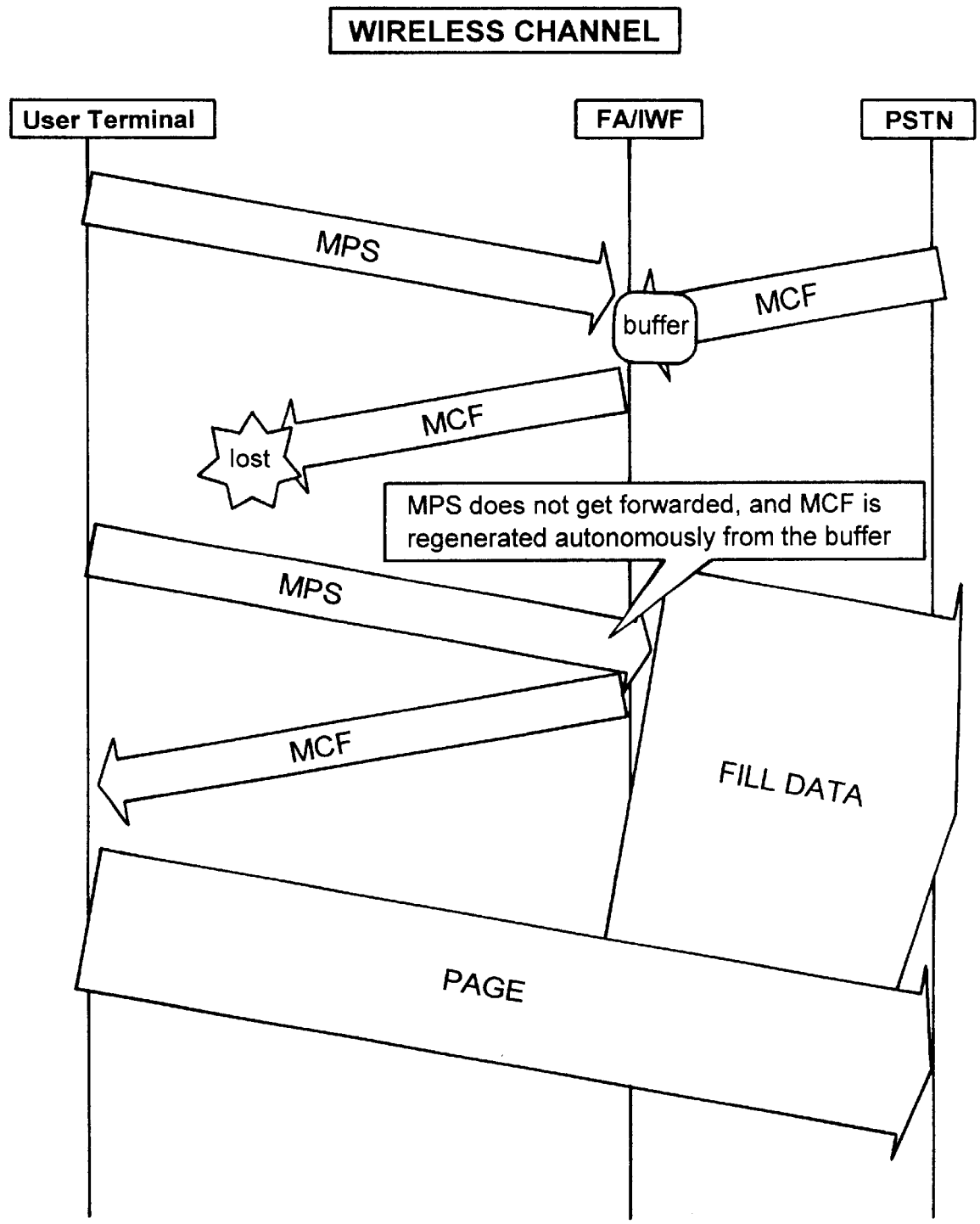
FIG. 11 is an illustration of autonomous retransmission of valid responses.

As shown in FIG. 11, the Network_IFR shall store the responses such as CFR and MCF in a buffer before forwarding to the other end. If the forwarded response CFR or MCF gets corrupted in the wireless or wireline channel, the Network_IFR may receive a retransmitted DCS-TCF or MPS while it is transmitting fill data towards the receiving fax machine as defined above. In this case, the Network_IFR shall not forward the retransmitted DCS-TCF or MPS to the other end. Instead, it should simply ignore those retransmitted commands and autonomously regenerate the response to the retransmitted command from the buffer where it has been previously stored. The Network_IFR shall continue with the transmission of the fill data without any interruption.

CRP Handling

Figure 12:
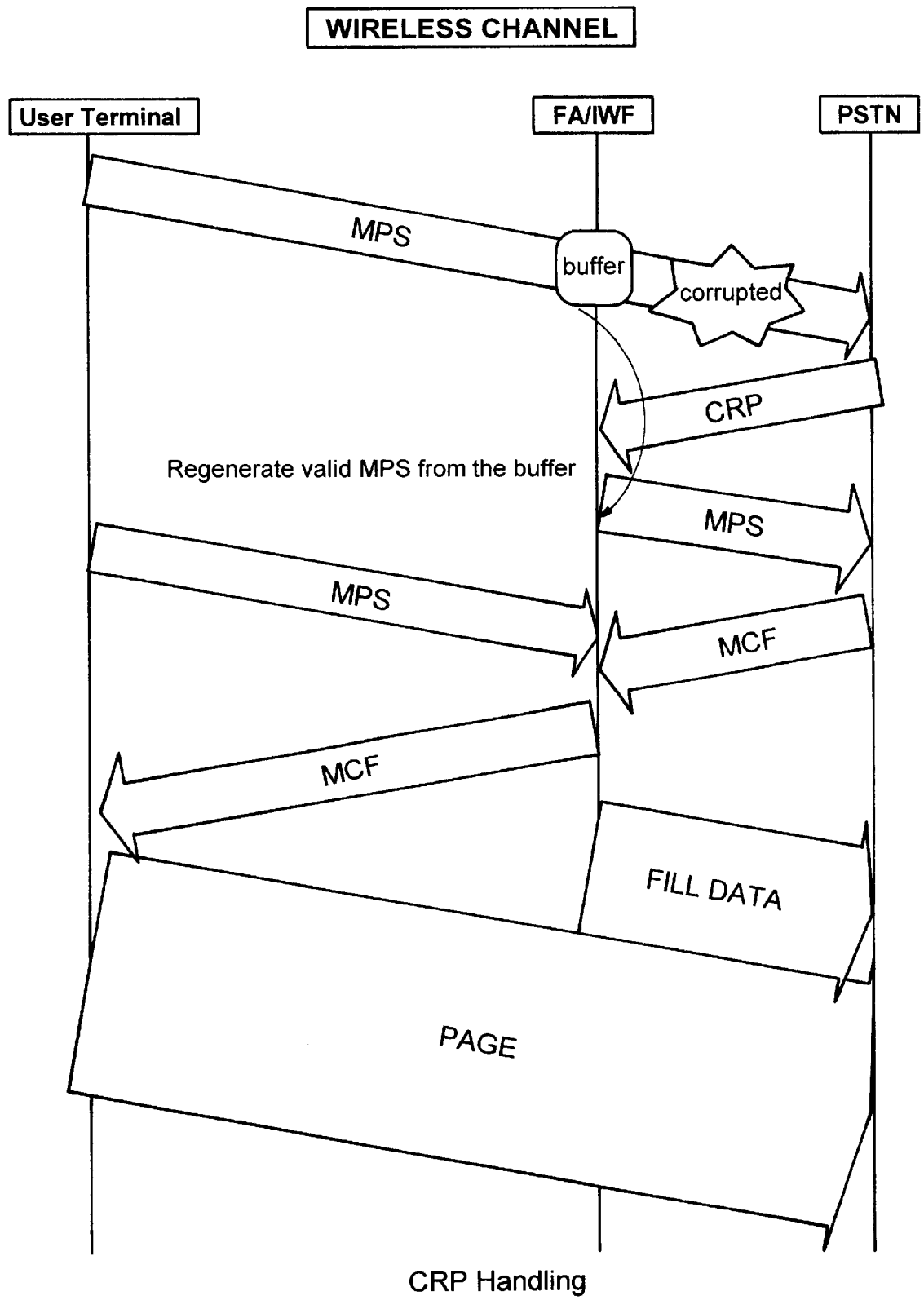
FIG. 12 is an illustration of CRP handling.

As shown in FIG. 12, the fax machine may send out a Command Repeat (CRP) frame as a response if it receives a corrupted HDLC frame, to request the sending entity to retransmit the previous command or response frame. So, if the Network_IFR receives CRP frame as a response to any of the transmitted command/response frame, it shall regenerate the valid previous command/response frame that was stored in the buffer without forwarding the CRP frame to the other end. If a valid command has not previously been stored in the buffer, the Network_IFR should forward the CRP frame to the other end.

Conversion of RTP to RTN

While operating at 2400 bps, some of the fax machines that do not have adequate memory to store the pages may disconnect if they receive RTN message that requests the sending fax machine to retransmit the previous page after exchanging the training sequence again. To let the call successfully complete at the fallback rate, it is recommended that the Network_IFR shall modify the RTN message type to that of RTP before forwarding to the other end.

It should be appreciated that a wide range of changes and modifications may be made to the preferred embodiments for improving facsimile call success rates in long delay environments as described herein. Thus, it is intended that the foregoing detailed description be regarded as illustrative rather than limiting, and that the following claims, including all equivalents, are intended to define the scope of the invention.

What is claimed is:

1. A facsimile transmission relay apparatus for improving call success rates in long delay environments, comprising:
   a first bi-directional telecommunication interface for receiving a facsimile signal from a transmitting facsimile device via a first network;
   a buffer for storing said facsimile signal;
   a second bi-directional telecommunication interface for retransmitting said facsimile signal via a second network to a receiving facsimile device; and
   an information processor coupled to said second interface for selectively generating facsimile signal messages to the receiving facsimile device to maintain communications with the transmitting facsimile device via the first and second networks independent of prior facsimile signal message collisions.

2. An apparatus as recited in claim 1 wherein said information processor buffers signals received via said first bi-directional telecommunications interface in said buffer to avoid collisions with signals transmitted via said second network from the receiving facsimile device.

3. An apparatus as recited in claim 1 wherein said information processor originates manufactured signals in response to the signals received via said first bi-directional telecommunications interface, said manufactured signals being stored for transmission from said buffer to maintain communications via said first and second networks.

4. An apparatus as recited in claim 1 wherein said information processor accesses signals received via said first bidirectional telecommunications interface for storing in said buffer to avoid call disruption.

5. An apparatus as recited in claim 4 wherein said information processor accesses the received signals to determine whether the signals are valid or corrupted.

6. An apparatus as recited in claim 5 wherein said information processor blocks the received signals determined to be corrupted.

7. An apparatus as recited in claim 2 wherein said buffer comprises a memory for storing responses from command receiving entities and for avoiding collisions with a retransmitted command from the command sending entities.

8. An apparatus as recited in claim 7 wherein said buffer comprises a memory for storing the ITU-T T.30 commands from the transmitting facsimile device, and avoids collisions with the ITU-T T.30 responses from the receiving facsimile device.

9. A message transmission system for improving facsimile call rates in long delay environments, comprising:
   an interface for coupling a facsimile compatible transmission and reception device to a telecommunications network; and
   a bi-directional communications channel associated with said interface position between the facsimile compatible device and the telecommunications network for buffering messages transmitted by and between said device and other such devices coupled to the telecommunications network;
   said communications channel buffering the transmitted messages on the telecommunications network for selectively generating facsimile signal messages to receiving facsimile devices to maintain communications via the telecommunications network independent of facsimile signal message collisions.

10. A system as recited in claim 9 wherein said information processor generates messages for maintaining communications between the devices.

11. A system as recited in claim 10 wherein said information processor identifies corruptive messages, replacing the corruptive messages with buffered messages for transmission over the telecommunications network.

12. A system as recited in claim 11 wherein said information processor is used to intelligently decide whether to transmit, rewrite, buffer, or discard individual messages.

13. A system as recited in claim 9 comprising a second information processor coupled to the telecommunications network for monitoring messages from a receiving facsimile device and for generating messages to the receiving facsimile device to maintain communications with a transmitting facsimile device via the telecommunications network.

14. A system as recited in claim 9 wherein said telecommunications network comprises a wireless network.

15. A system as recited in claim 9 wherein said interface is coupled to said facsimile device between a Public Switch Telephone Network (PSTN) and a wireless telecommunications network.

16. A method of facsimile message transmission for improving call rates in long delay environments, comprising the steps of:
- coupling a facsimile compatible transmission and reception device to a telecommunications network;
- providing a bi-directional communications channel between the facsimile compatible device and the telecommunications network for buffering messages transmitted by and between the devices and other such devices coupled to the telecommunications network; and
- buffering the transmitted messages with the communications channel for selectively generating facsimile signal messages to the receiving facsimile comparable device to maintain communications with the transmitting facsimile device via the telecommunications network independent of facsimile signal message collisions.

17. A method as recited in claim 16 wherein the buffering step provides an information processor which interfaces with the telecommunications network for manipulating transmitted and received messages to avoid and correct message signal corruption.

18. A method as described in claim 17 wherein the information processor intelligently blocks or relays a FTT response depending on whether the FTT response was received before or after the information processor received the second DCS-TCF from the transmitting facsimile machine.

19. A method as recited in claim 18 where the information processor creates a DCS with valid FCS and highly corrupted TCF and transmits it to the receiving facsimile machine if the information processor has not received a valid response even after a third DIS has been received from the receiving facsimile machine, thereby provoking a FTT from the receiving facsimile machine and keeping the connection alive.

20. A method as recited in claim 19 where the information processor creates a RTN frame with valid FCS and transmits it to the transmitting facsimile machine if the information processor has not received a valid response even after a third MPS/EOP/EOM has been received from the transmitting facsimile machine, thereby keeping the connection alive.

21. A method as recited in claim 18 comprising the step of generating a fill data with appropriate number of EOL sequences for concatenating fill data with a received image of the facsimile message transmission.

22. A method as recited in claim 17 wherein the information processor monitors transmitted and received messages and avoids T2 time outs using HDLC flags.

23. A method as recited in claim 17 wherein said buffering step generates a buffered response to a retransmitted command if a valid response was received for the first command and subsequently corrupted after the information processor had relayed to the command sending device.

24. A method as recited in claim 17 wherein said buffering step generates a buffered command upon receipt of a CRP command where a valid command was already received and was corrupted after the information processor had relayed to the command sending device.

25. A method as recited in claim 17 wherein the information processor converts an RTN to an RTP to manipulate the command to maintain a 2,400 bits per second communications rate forming data communications with the transmitting device via the telecommunications network.

* * * * *